(12) United States Patent
Drath et al.

(10) Patent No.: US 6,852,359 B2
(45) Date of Patent: Feb. 8, 2005

(54) HEAT-RESISTANT, PAINTABLE TWO-SIDED ACRYLIC-BASED ADHESIVE TAPE AND METHOD OF APPLYING TO SUBSTRATES

(75) Inventors: David J. Drath, Dexter, MI (US); Linda Hall, Jackson, MI (US); Dennis K. Fisher, Brooklyn, MI (US)

(73) Assignee: Adco Products, Inc., Michigan Center, MI (US)

( * ) Notice: Subject to any disclaimer, the term of this patent is extended or adjusted under 35 U.S.C. 154(b) by 66 days.

(21) Appl. No.: 10/445,692

(22) Filed: May 27, 2003

(65) Prior Publication Data

US 2003/0219593 A1 Nov. 27, 2003

Related U.S. Application Data

(63) Continuation-in-part of application No. 10/266,310, filed on Oct. 8, 2002.
(60) Provisional application No. 60/367,548, filed on Mar. 26, 2002.

(51) Int. Cl.[7] .............................. B32B 9/00; C09J 9/00; B05D 7/14
(52) U.S. Cl. ................. 427/207.1; 427/154; 427/372.2; 427/532
(58) Field of Search .............................. 428/40.1, 41.5, 428/41.7, 343, 354, 355 AC; 427/207.1, 154, 532, 372.2

(56) References Cited

U.S. PATENT DOCUMENTS

| | | |
|---|---|---|
| 4,499,130 A | 2/1985 | Questel et al. |
| 4,623,413 A | 11/1986 | Questel et al. |
| 4,968,558 A | 11/1990 | Fisher et al. |
| 5,183,833 A | 2/1993 | Fisher et al. |
| 5,264,278 A | 11/1993 | Mazurek et al. |
| 5,354,600 A * | 10/1994 | Fisher et al. ................. 428/215 |
| 5,385,772 A | 1/1995 | Slovinsky et al. |
| 5,527,595 A | 6/1996 | Slovinsky et al. |
| 5,830,571 A | 11/1998 | Mann et al. |
| 5,907,018 A | 5/1999 | Mazurek et al. |
| 6,023,898 A | 2/2000 | Josey |
| 6,048,806 A | 4/2000 | Deeb et al. |
| 6,299,945 B1 | 10/2001 | Mertz et al. |
| 6,365,254 B1 | 4/2002 | Zoller et al. |

FOREIGN PATENT DOCUMENTS

JP 11029751 2/1999

OTHER PUBLICATIONS

Yemm & Hart, Flexisurf (Plasticized PVC) Material Safety Data Sheet, reprinted on May 4, 2004 at http://www.yemhart.com/materials/flexisurf/msds.htm.*
Price quotation dated Sep. 9, 1999 made to Venture Industries for acrylic tape with heat resistant release liner.

* cited by examiner

Primary Examiner—Harold Pyon
Assistant Examiner—Brian P. Egan
(74) Attorney, Agent, or Firm—Dinsmore & Shohl LLP

(57) ABSTRACT

A heat-resistant, paintable two-sided acrylic-based adhesive tape and method for adhering the tape to two substrates is provided. The tape is comprised of a solid acrylic-based carrier including an acrylic-based adhesive on both sides of the carrier. In use, the tape is adhered on one side to a first substrate, and adhered on the other side to a second substrate. The two substrates with the tape are then exposed to elevated temperatures such as those encountered in an automotive, appliance, or other commercial paint bake process. The tape can withstand temperatures up to 300° F. and can be painted without degradation of the adhesive and without a reduction of the adhesive properties of the tape.

9 Claims, 2 Drawing Sheets

HEAT-RESISTANT, PAINTABLE TWO-SIDED ACRYLIC-BASED ADHESIVE TAPE AND METHOD OF APPLYING TO SUBSTRATES

CROSS-REFERENCE TO RELATED APPLICATIONS

This application is a continuation-in-part of U.S. application Ser. No. 10/266,310 filed Oct. 8, 2002, which application claims the benefit of U.S. Provisional Application Ser. No. 60/367,548, filed Mar. 26, 2002. These applications are incorporated herein by reference.

BACKGROUND OF THE INVENTION

The present invention relates to a heat-resistant, paintable acrylic-based adhesive tape. More particularly, the present invention relates to a two-sided acrylic-based adhesive tape and a method of adhering both sides of the tape to two substrates, where the tape can withstand environmental conditions encountered in automotive, appliance, and other commercial paint processes without degradation or a reduction in adhesive properties of the tape.

Acrylic pressure sensitive adhesive tapes are widely used in the automotive and appliance industry to bond a wide variety of substrate materials, and in particular, the application of painted exterior automotive body side moldings, sub-assemblies or trim parts. A common method of application is to use an acrylic attachment tape comprised of a foam core which adheres the substrate materials to the vehicle or appliance. However, a disadvantage of such foam core tapes is that they cannot withstand exposure to a paint bake cycle in which the part is painted and subsequently exposed to high temperatures in a paint oven to cure the painted part. For example, the foam core loses compressibility after the introduction of paint, thereby reducing the ability of the tape to sufficiently wet-out to the mating surface. In addition, the foam core may also break down as entrapped air in the foam expands at the elevated temperatures encountered in the bake cycle, rupturing the foam's cell structure, which also impedes wet-out and structural strength. Expanded gas can also collect at the tape-surface interface where it interferes with surface wet-out and bond strength.

In order to avoid the degradation of foam core acrylic tapes, the use of a separate masking tape has been employed which is applied to the part prior to the paint bake cycle in the area of the part which is to receive the foam core acrylic attachment tape to prevent that area from receiving paint. The masking tape is then removed after the paint bake cycle and the attachment tape is applied. However, the use of the masking tape adds additional steps and materials to the manufacturing process, which is both time-consuming and costly.

In order to avoid this extra step, the use of adhesive tapes which are heat-resistant have been developed. These adhesive tapes generally comprise a two-sided solid acrylic-based carrier and a heat resistant liner on one side of the carrier. The tape can be attached on one side to a substrate such as an automotive part and then exposed to elevated temperatures such as a paint baking process without being subject to degradation. The liner may be removed at a later time such that the part can be adhered to a second substrate surface, such as the exterior surface of an automobile, which is then subjected to a paint baking process in a separate step.

However, in order to save additional steps, it would be desirable to be able to apply a two-sided adhesive tape to two substrates prior to the paint baking process so that the substrates could be painted simultaneously. Accordingly, there is still a need in the art for a tape which may be applied to two substrates and which is not adversely affected when exposed to paint, primers, and elevated temperatures such as those encountered in automotive, appliance, and other commercial painting processes.

SUMMARY OF THE INVENTION

The present invention meets that need by providing a heat-resistant, two-sided adhesive tape including a solid core acrylic-based carrier. The tape is conformable to the shape of the substrate(s) to which it is attached. The tape is also paintable, i.e., it will not degrade as a result of exposure to paints and primers encountered during paint processing.

The tape withstands temperatures up to about 300° F. (150° C.), and eliminates both the need for a separate masking and the need for die cutting when used in the application of paintable automotive parts, appliance trim or subassembly parts, and other painted substrates.

According to one aspect of the present invention, a heat-resistant, two-sided acrylic-based tape is provided comprising a solid acrylic-based carrier having first and second sides, and an acrylic-based adhesive on both sides of the carrier.

By "solid" carrier, it is meant that the carrier has substantially no gaseous cells (however, the carrier may include microspheres). The carrier or core may be comprised of a single carrier or adhesive material, or a laminate comprising layers of similar or dissimilar carrier or adhesive materials. Thus, the solid carrier is not cellular and will not absorb paint, nor will any gases entrapped in the tape core result in expansion upon exposure to elevated temperatures.

The heat-resistant tape can withstand temperatures up to about 300° F. (150° C.) without degradation of the acrylic-based adhesive, and without reducing the bonding properties of the acrylic-based adhesive. The tape is also paintable. By paintable, it is meant that the tape can withstand exposure to paints or primers used in a paint bake cycle without any adverse affects, i.e., without degradation of the acrylic-based adhesive, and without reducing the bonding properties of the acrylic-based adhesive. By "paint bake cycle", it is meant a process in which the tape is preferably adhered on both sides to substrates such as an automotive, appliance, or other commercial parts, primed, painted, and then passed through a paint bake oven which is used to cure the painted parts. The oven temperatures typically range from about 200° F. to 300° F. (80° C. to 150° C.) and cure times range from 25 minutes to 2 hours.

The heat-resistant tape preferably has a peel strength of at least 20 N/cm to the painted substrate(s) after being processed through a paint bake cycle. Preferably, the tape has a thickness of about 0.5 to 2.0 mm.

The heat-resistant tape preferably further includes a release liner adhered to at least one side of the adhesives on the carrier. The release liner is preferably conformable so that it conforms to the surface of the substrate to which the tape is adhered without separating from the tape. To fulfill the requirements of conformability for the present invention, the tape construction (including the liner) must be able to conform to a minimum of a 2-inch radius for a 1-inch wide tape and a 1-inch radius for a 0.5 inch-wide tape.

The conformable release liner is preferably comprised of a polyvinyl chloride-based material. The release liner preferably remains in contact with the tape during shipping and storage prior to use.

The heat-resistant tape of the present invention may be applied in a variety of ways. The tape can be adhered to two substrates by adhering one side of the two-sided tape to at least one area of a first substrate, and adhering the other side of the tape to at least one area of a second substrate. The substrates with the tape adhered thereon may then be painted and exposed to temperatures up to 300° F. (150° C.) to cure and dry the paint. Preferred substrate materials include wood, metal, glass, thermoplastic olefins, acrylonitrile-butadiene styrene, and polyvinyl chloride-based materials. The first and second substrates may comprise the same or different materials.

In use, the heat resistant tape is preferably adhered on one side to a first substrate such as an automotive or appliance trim or part, then adhered to a second substrate such as an exterior part of an automobile or appliance and then passed through a paint bake cycle such that the two substrates are simultaneously painted and/or exposed to heat curing or heat processing operations with the tape adhered to their surfaces.

Accordingly, it is a feature of the present invention to provide a heat-resistant, two-sided acrylic-based adhesive tape which may be adhered on both sides to two substrates and exposed to paint and elevated temperatures such as those encountered in a paint bake cycle without degradation of the tape. Other features and advantages of the invention will be apparent from the following description, the accompanying drawings, and the appended claims.

DETAILED DESCRIPTION OF THE PREFERRED EMBODIMENTS

The heat-resistant, two-sided acrylic-based adhesive tape of the present invention provides a number of advantages over prior acrylic tapes currently used in producing painted automotive exterior trim products, appliance trim, or other commercial painted substrates where a pressure sensitive adhesive tape is used. Use of the conformable, heat-resistant adhesive tape of the present invention eliminates the need for die cutting the tape in order to match the curvature of the substrate. Because the tape is paintable, there is no need for a separate masking tape. And, the tape may be used to adhere two substrates together such that the substrates may be painted simultaneously, which results in substantial savings due to the elimination of manufacturing steps and materials.

Figure 1:
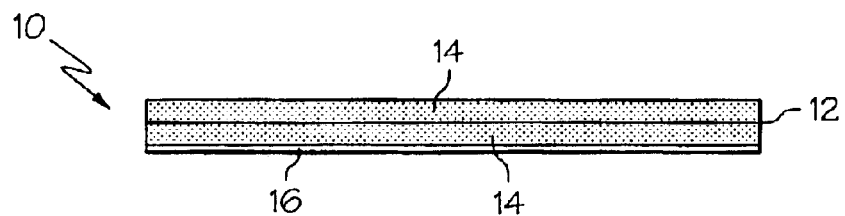
FIG. 1 is a side view of the heat-resistant tape of the present invention.

Referring now to FIG. 1, the heat-resistant two-sided acrylic-based adhesive tape 10 of the present invention is illustrated. The tape includes a solid carrier 12 with an acrylic-based pressure sensitive adhesive 14 on both sides of the carrier. The acrylic-based pressure sensitive adhesive 14 is preferably formulated from a combination of non-tertiary acrylic acid esters of alkyl alcohols and ethylenically unsaturated monomer(s) having at least one polar group. The adhesive is preferably comprised of non-tertiary acrylic acid alkyl esters formed from alcohols having from about 4 to about 12 carbon atoms, and preferably from about 6 to 10 carbon atoms, particularly the non-tertiary acrylic acid alkyl ester, 2-ethylhexyl acrylate. Specific examples of suitable adhesive formulations are disclosed in U.S. Pat. No. 5,354,600, the disclosure of which is incorporated herein by reference.

Crosslinking agents such as di- and triacrylates, may also be included in the adhesive formulation, generally in amounts of from about 0.005 to about 0.5 weight percent, based on total weight of polymer in the adhesive formulation, and more preferably, from about 0.01 to about 0.2 weight percent. Suitable crosslinking agents may also be present such as 1,6 hexane diol diacrylate. Other crosslinking agents including commercially available organofunctional silanes may also be utilized.

The adhesive is preferably formed by at least partially photopolymerizing the formulation by exposure to UV radiation as described in commonly-assigned U.S. Pat. No. 5,183,833, the disclosure of which is hereby incorporated by reference.

A preferred acrylic-based adhesive formulation for use in the present invention includes from about 60–90% by weight 2-ethylhexyl acrylate, 1–20% by weight acrylic acid, about 2% by weight of an initiator, about 2% of a compatible crosslinking agent such as hexane diol diacrylate, about 5% by weight silica, and from about 5–20% by weight polyvinyl acetate. This monomeric formulation is preferably cured to at least 95% by weight solids.

In a preferred embodiment, the acrylic-based carrier for the tape comprises a pressure sensitive adhesive matrix formed from a crosslinked polymer which may include acrylic acid esters of primary or secondary alcohols. The adhesive matrix preferably includes a filler comprising dispersed organic particulate solids which are compatible with the matrix. The carrier may be formed by extruding a combination of the polymer and filler as described in commonly-assigned U.S. Pat. No. 5,385,772, the disclosure of which is hereby incorporated by reference. The carrier may be comprised of a single material, or a laminate comprised of several layers of dissimilar materials.

By using a solid carrier, the tape will not absorb paint in a paint bake cycle as would occur with the use of prior foam core tapes. Additionally, there is no cellular structure to entrap air that would expand and degrade the tape with the introduction of elevated temperatures such as those encountered in automotive, appliance, or other commercial paint bake or annealing processes.

The tape also preferably includes a conformable liner 16 on one or both sides of the tape to protect the adhesive surfaces of the tape during shipment and storage prior to use. The liner preferably comprises polyvinyl chloride-based polymers, but may include other polyvinyl chloride-based films as well as other polymer films which possess the desired conformability.

The tape of the present invention may be provided in a number of forms, including strips which are slit to a desired length. Alternatively, the tape may be wound in continuous form in a roll or on a spool.

Figure 2:
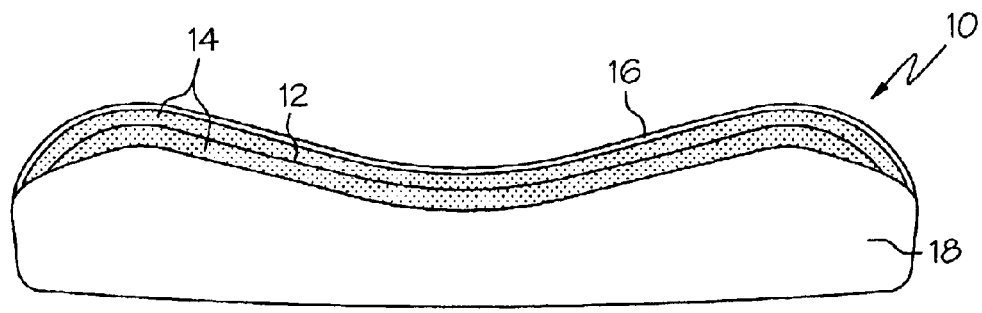
FIG. 2 is a side view of the tape adhered to a first substrate.

As shown in FIG. 2, the heat-resistant tape 10 is preferably adhered to a first substrate 18 such as an automotive or appliance trim part. The substrate surface should be clean (i.e., free of oils and other contaminants) to allow proper adhesion. Depending on the type of substrate, an adhesion promoter or primer may be applied to the substrate surface prior to application of the tape. The tape is flexible so as to match the topology of the substrate, thus it curves and conforms to the substrate. While the tape is illustrated on only one area of the substrate, it should be appreciated that multiple pieces of tape may be applied to different areas of the substrate. Alternatively, the tape may be substantially coextensive with the surface of the substrates. The tape may also be formed into different sizes or shapes as needed, for example, in use with die-cut parts and extruded profiles.

Figure 3:
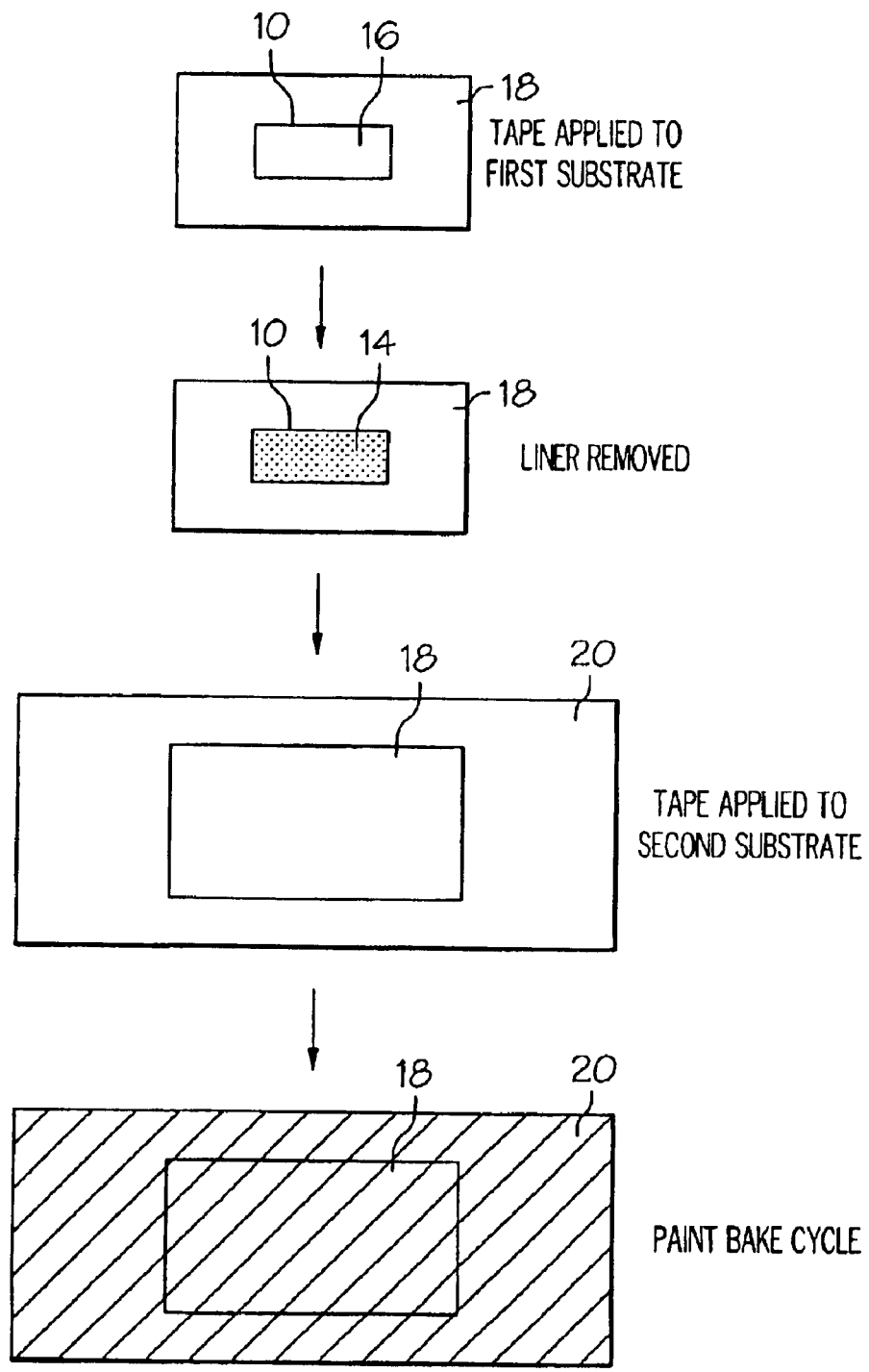
FIG. 3 is a flow diagram illustrating the method of applying the tape to two substrates and passing the substrates through a paint bake cycle.

FIG. 3 illustrates, in flow chart form, a preferred embodiment of the invention in which the tape 10 is adhered on one side to a first substrate 18 such as an automotive or appliance trim part. Liner 16 is removed to expose the opposite surface of adhesive 14. The tape is then adhered on the other side to a second substrate 20 such as an exterior automotive or appliance part. The tape may be adhered to a wide variety of substrates including, but not limited to, wood, glass, metal, thermoplastic olefins, acrylonitrile butadiene styrene, polyvinyl chloride-based materials, reaction injection molded parts, and clear coated parts. In automotive applications, the first substrate may be in the form of exterior trim including body side molding, wheel well flares, reveal moldings, roof ditches, and other paintable parts, and the second substrate may be in the form of an exterior automotive part. In appliance applications, the first substrate may be in the form of metal trim, casements, or other paintable parts, and the second substrate may comprise the exterior portion of the appliance.

After application of the tape 10 to the first and second substrates 18, 20, the substrates with the tape in between are then painted and processed through a paint bake cycle as shown. The paint bake cycle typically lasts for about 30 minutes at a temperature of about 250° F. (120° C.). The substrates may optionally be coated with a primer prior to painting. In the method of the present invention, the paint used in the paint bake cycle is preferably an epoxy, urethane, or acrylic-based paint. The paint may be a powder-based paint or a conventional automotive solvent-based paint, which may or may not include a powder-based paint.

It will be apparent to those skilled in the art that various changes may be made without departing from the scope of the invention which is not considered limited to what is described in the specification.

What is claimed is:

1. A method of adhering two substrates to a heat resistant two-sided acrylic based tape comprising:

1.) providing first and second substrates;
   2.) providing a heat resistant two-sided acrylic-based tape comprising a solid acrylic-based carrier, a prepolymerized acrylic-based adhesive on both sides of said carrier, and a conformable heat resistant liner comprised of polyvinyl-chloride based material adhered to at least one side of said adhesives on said carrier; wherein said adhesive and liner withstand temperatures of 300° F.;
   3.) adhering one side of said heat resistant two-sided acrylic-based tape to at least one area of said first substrate;
   4.) removing said heat resistant liner from the other side of said tape and adhering the other side of said tape to at least one area of said second substrate; and
   5.) exposing said substrates and said tape to temperatures up to 300° F., wherein the bonding properties of said tape are not reduced.

2. The method of claim 1 wherein said first and second substrates are selected from the group consisting of wood, metal, glass, thermoplastic olefins, acrylonitrile-butadiene styrene, and a polyvinyl chloride-based material.

3. The method of claim 1 wherein said first and second substrates are comprised of different materials.

4. The method of claim 1 wherein said first and second substrates comprise automotive or appliance parts.

5. The method of claim 1 wherein said first substrate comprises an exterior part for an automotive vehicle and said second substrate comprises automotive trim.

6. The method of claim 1 wherein exposing said substrates to temperatures up to 300° F. includes passing said substrates with said tape thereon through a paint bake cycle.

7. The method of claim 1 including painting said substrates with said tape thereon.

8. The method of claim 7 wherein said substrates are painted simultaneously.

9. The method of claim 7 wherein said substrates and tape are painted with a powder based paint.

* * * * *